March 24, 1959     H. H. HOLMSTROM     2,878,780
COVER FOR PULSATOR
Filed July 2, 1957
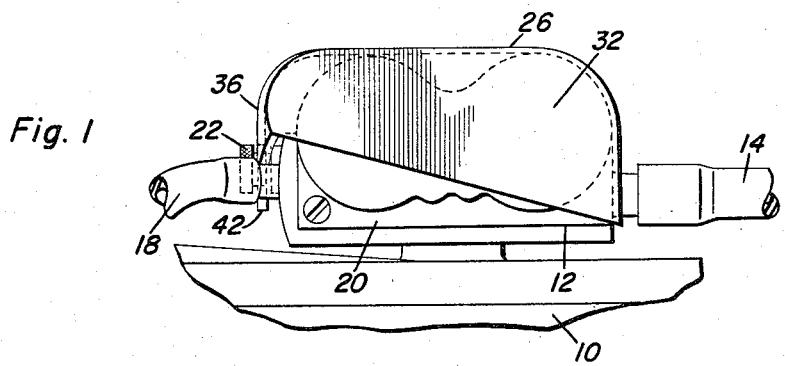
Fig. 1
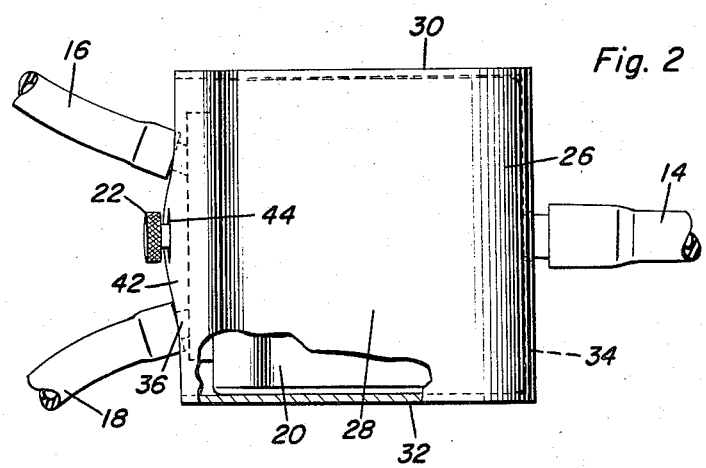
Fig. 2
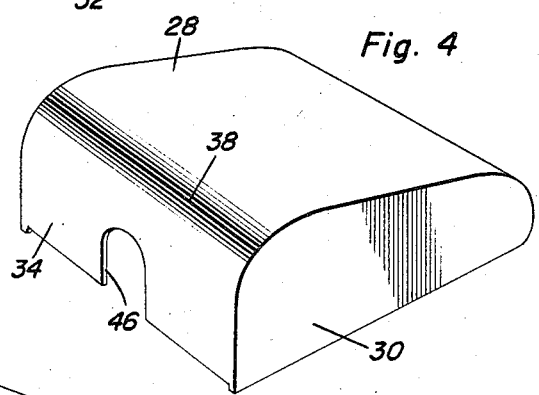
Fig. 4
Fig. 3
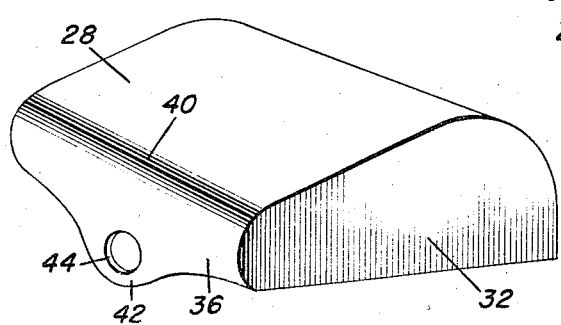
Hartwin H. Holmstrom
INVENTOR.

United States Patent Office 2,878,780
Patented Mar. 24, 1959

2,878,780

COVER FOR PULSATOR

Hartwin H. Holmstrom, Georgetown, Tex.

Application July 2, 1957, Serial No. 669,490

3 Claims. (Cl. 119—14.39)

The invention relates to a cover for a pulsator and more particularly to a cover that is to be used on the top of a surge pulsator.

The pulsator with which the invention deals is a pulsator for use with milking equipment and to which the teat cups are attached. The pulsator has an opening on its top to lend access to some of the valves. While it is being used water, dirt and other impurities and foreign substances very frequently get into the opening and onto the valves, thereby causing them to function improperly or to stop functioning completely.

An object of this invention is to provide a cover which fits over this opening and which prevents any impurities from getting into the valves.

A further object of the invention is to provide a specially constructed cover for a milking equipment pulsator, the cover being of a particular construction and serving the specific function mentioned above.

Other objects and features of importance, such as the mechanical simplicity of the invention will become apparent, in following the description of the illustrated form of the invention.

Figure 1 is a fragmentary elevational view of a pulsator having a cover in accordance with the invention disposed thereon;

Figure 2 is a top plan view of the structure in Figure 1;

Figure 3 is a perspective view of the cover in Figure 1, and;

Figure 4 is another perspective view showing the same cover but from a different angle of perspective.

In the accompanying drawing there is a milking machine 10 schematically represented and having a pulsator 12 attached thereon. The pulsator has a vacuum hose 14 extending from one end thereof and a plurality of milk tubes 16 and 18 extending from the opposite end thereof. The pulsator has a pulsator body 20 in which the various valves are located. The pressure regulator knob 22 extends from body 20 and is on the same side of the pulsator 12 as the tubes 16 and 18.

As described previously the various valves in the pulsator are ordinarily exposed in an opening in the top of a pulsator body 20. My invention provides cover 26 which is especially constructed to fit over the pulsator 20. The cover has a top wall 28, two sides 30 and 32 and two end walls 34 and 36 respectively. The end wall 34 has a rounded junction or corner 38 with top wall 28, and the wall 36 has a rounded junction or corner 40 connecting it with the top wall 28. When the top wall 28 is horizontal, the side walls will have a sloped lower edge (Figure 1). This forms an opened bottom and closure of the proper dimension to fit over the pulsator body 20.

The wall 36 has a tab 42 depending from its center and there is an aperture 44 in tab 42. At a position longitudinally aligned with aperture 44 there is a notch 46 in wall 34.

In use, the cover 26 is fitted on the pulsator body 20. Knob 22 is passed through hole 44 while the notch 46 forms a saddle bearing on the nipple of the pulsator body on which the vacuum hose 14 is attached. This makes the cover easily separable from the pulsator body but yet, the cover is held sufficiently firmly to retain its position on the pulsator.

It is understood that various changes and modifications may be made without departing from the invention as claimed.

What is claimed as new is as follows:

1. For use on a milking machine pulsator that has a vacuum hose nipple, spaced milk tubes and a body from which the nipple and tubes protrude, a protective cover for the pulsator and comprising a top wall, side and end walls attached to said top wall forming an opened bottom enclosure which is adapted to be seated upon the pulsator body, and one of said walls having a notch that forms a saddle within which to accept said nipple, another of said walls having a tab protruding therefrom and fitted between the spaced milk tubes thereby retarding the cover from shifting laterally on the pulsator body.

2. A protective cover assembly for a milking machine pulsator that has a body from which a vacuum hose nipple, a pressure regulator knob, and spaced milk tubes protrude comprising a top wall and a depending wall attached thereto forming an open bottomed enclosure which is adapted to be seated upon the pulsator body, an opening provided in one end of said assembly for accommodating said pressure regulator knob which passes therethrough, a notch formed in the other end of said assembly and forming a saddle within which to accept said nipple whereby said cover assembly may be easily removed from said pulsator by separating said saddle from the nipple and passing said opening over the knob.

3. A protective cover assembly for a milking machine pulsator that has a body from which a vacuum hose nipple, a pressure regulator knob, and spaced milk tubes protrude comprising a top wall and a depending wall attached thereto forming an open bottomed enclosure which is adapted to be seated upon the pulsator body, an opening provided in one end of said assembly for accommodating said pressure regulator knob which passes therethrough, a notch formed in the other end of said assembly and forming a saddle within which to accept said nipple whereby said cover assembly may be easily removed from said pulsator by separating said saddle from the nipple and passing said opening provided in one end over the knob, said opening being formed in a tab projecting from said cover assembly, said tab having a lower edge which is curved upwardly and outwardly for allowing clearance for said spaced milk tubes and retarding said cover assembly from shifting laterally on said pulsator body.

References Cited in the file of this patent

UNITED STATES PATENTS 2,665,702     Rawson  ---------------- Jan. 12, 1954